US009108486B2

(12) United States Patent
Paquin

(10) Patent No.: US 9,108,486 B2
(45) Date of Patent: Aug. 18, 2015

(54) VEHICLE BASED CLIMATE REGULATION EXTENSION APPARATUS

(76) Inventor: Steven Mikel Paquin, Surprise, AZ (US)

( * ) Notice: Subject to any disclaimer, the term of this patent is extended or adjusted under 35 U.S.C. 154(b) by 809 days.

(21) Appl. No.: 13/160,730

(22) Filed: Jun. 15, 2011

(65) Prior Publication Data

US 2012/0322355 A1    Dec. 20, 2012

(51) Int. Cl.
*B60H 1/24* (2006.01)
*B60H 1/00* (2006.01)

(52) U.S. Cl.
CPC ........ *B60H 1/00564* (2013.01); *B60H 1/00592* (2013.01)

(58) Field of Classification Search
CPC ........... B60H 1/00564; B60H 1/00507; B60H 1/00521; B60H 1/00528; B60H 1/0055; B60H 1/34; F24F 13/084
USPC ......... 454/119, 123, 125, 127, 132, 143, 145, 454/152, 155, 162, 306; 29/428; 165/41
See application file for complete search history.

(56) References Cited

U.S. PATENT DOCUMENTS

| 4,981,324 | A * | 1/1991 | Law ................. 297/180.11 |
| 6,132,307 | A * | 10/2000 | Wills ................. 454/118 |
| 6,843,717 | B1 * | 1/2005 | Bennett ................. 454/152 |
| 6,884,159 | B1 * | 4/2005 | Ferraud, Jr. ............. 454/119 |
| 7,670,401 | B2 * | 3/2010 | Whittemore ............. 55/480 |
| 2008/0093843 | A1 * | 4/2008 | Noroozi et al. ............. 285/81 |

* cited by examiner

*Primary Examiner* — Kang Hu
*Assistant Examiner* — Dana Tighe
(74) *Attorney, Agent, or Firm* — James M Smedley LLC; James M. Smedley, Esq.

(57) ABSTRACT

The present invention generally relates to vehicle based climate regulation systems. Specifically, this invention relates to an apparatus for extending and directing the flow of air-conditioning or heat within a vehicle by way of providing a connector and a detachable extension operable with a preexisting vehicle climate regulation system.

6 Claims, 5 Drawing Sheets

VEHICLE BASED CLIMATE REGULATION EXTENSION APPARATUS

FIELD OF THE INVENTION

The present invention generally relates to vehicle based climate regulation systems. Specifically, this invention relates to an apparatus for extending and directing the flow of air-conditioning or heat within a vehicle by way of providing a connector and a detachable extension operable with a preexisting vehicle climate regulation system.

BACKGROUND OF THE INVENTION

When it comes to vehicles, a common problem in inclement weather, whether it be hot or cold, is the distribution of climate regulation methods to various areas of a vehicle. For instance, in the case of most consumer cars and trucks, a set of vents are located in the front dashboard of the vehicle. These vents provide reasonable comfort to those in the driver and front passenger seat. However, these vents are ineffective when it comes to providing climate regulation to the passengers in rear seats. Typically, either the rear passengers receive subpar climate regulation or the driver and front passenger(s) are required to endure excessive climate regulation in order to provide reasonable climate regulation to those in the rear seats.

The inability of current vehicle based climate regulation systems to provide cooling or heating to passengers in rear seats can be hazardous or discomforting to those passengers. This may be particularly exacerbated where the rear passengers are incapable of expressing their discomfort (e.g., pets, infants).

Current solutions include modifying one or more of the dashboard vents with an affixed cover and tubing system to provide climate regulation to a passenger. For instance, in U.S. Pat. No. 7,437,883 to Baldal, a system is disclosed whereby a permanent or semi-permanent modification is made to a dashboard vent whereby a vent cover and tube system is applied that allows climate regulation through a single tube. Disadvantageously, the system is difficult to install and remove and may cause damage to the vehicle in the process.

Another problem with current systems are that, once attached, the tubing is attached to the vent and is not removable without removing the connection to the dashboard vent. Disadvantageously, if there are no rear passengers, the system actually serves to weaken the climate regulation to those in the front seats. Additionally, the tubing may take up space or cause clutter in the front seat that may not be desirable when no rear passengers are present.

Therefore, there is a need in the art for a vehicle based air-conditioning extension apparatus that connects to a dashboard vent of a vehicle without causing damage to the vehicle, does not require significant modification of the existing dashboard vent, is easily removable and provides a tubing system that is conveniently detachable. These and other features and advantages of the present invention will be explained and will become obvious to one skilled in the art through the summary of the invention that follows.

SUMMARY OF THE INVENTION

Accordingly, it is an object of the present invention to provide a vehicle based climate regulation extension apparatus that is capable of being easily installed, with detachable tubing and without requiring modification to an existing vent.

According to an embodiment of the present invention, a vehicle based climate regulation extension apparatus is comprised of a vent holder attachment, a tubing connector and an extension tube.

According to an embodiment of the present invention, a vehicle based climate regulation extension apparatus may be further comprised of a extension tube end cover.

According to an embodiment of the present invention, a vent holder attachment is configured to be readily and easily attached to a vehicle vent.

According to an embodiment of the present invention, a tubing connector is configured to be removably attachable to a vent holder attachment.

According to an embodiment of the present invention, an extension tube is attached to a tubing connector and is comprised of a flexible material with a hollow core and is of a length such that it is capable of reaching a specific area of a vehicle.

According to an embodiment of the present invention, in operation, the vehicle based climate regulation extension apparatus may be attached to the dashboard of a vehicle and used to direct a portion of the vehicle's climate regulation air-flow to a specific area of the vehicle.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

The present invention generally relates to vehicle based climate regulation systems. Specifically, this invention relates to an apparatus for extending and directing the flow of air-conditioning or heat within a vehicle by way of providing a connector and a detachable extension operable with a preexisting vehicle climate regulation system.

According to an embodiment of the present invention, a vehicle based climate regulation extension apparatus is comprised of a vent holder attachment, a tubing connector and an extension tube. Optionally, embodiments of the present invention may further be comprised of an exit end cover and/or an extension tube cover.

According to an embodiment of the present invention, a vent holder attachment is comprised of a vent cover unit that is designed to cover the entirety of a dashboard vent of a vehicle. The vent cover unit has a substantially-hollow center to allow airflow to pass through nearly unimpeded. The vent cover unit is further comprised of an attachment lattice that is configured to receive one or more attachment device for attaching the vent cover unit to the dashboard vent. Finally, the vent holder attachment is further comprised of a locking mechanism that is configured to removably receive a tubing connector.

Figure 1:
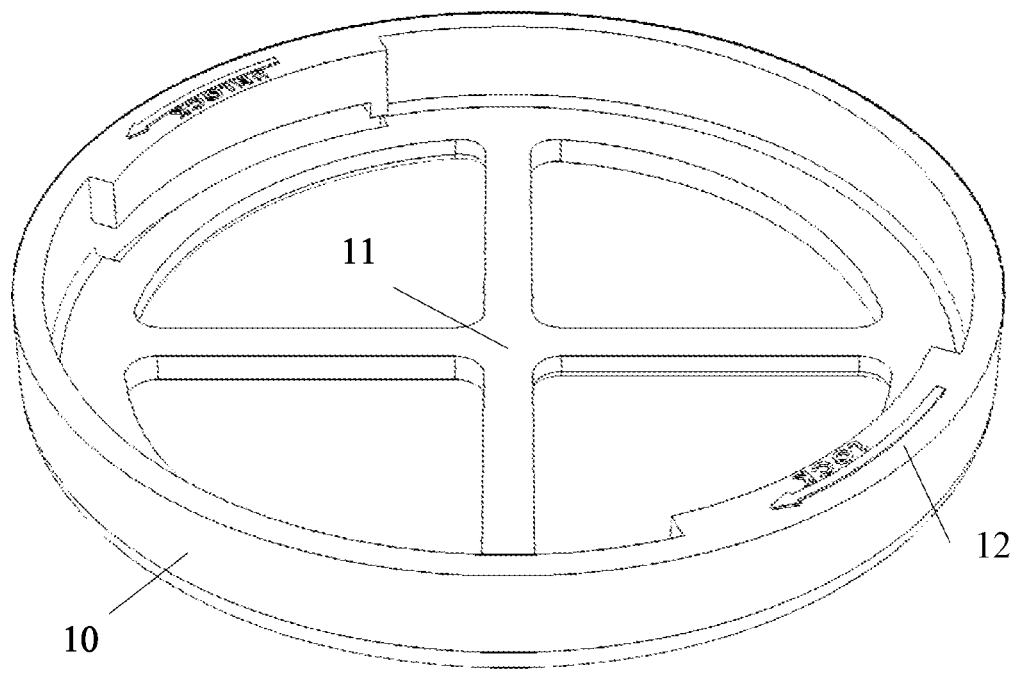
FIG. 1 shows a perspective view of a vehicle holder attachment in accordance with an embodiment of the present invention.
Figure 2:
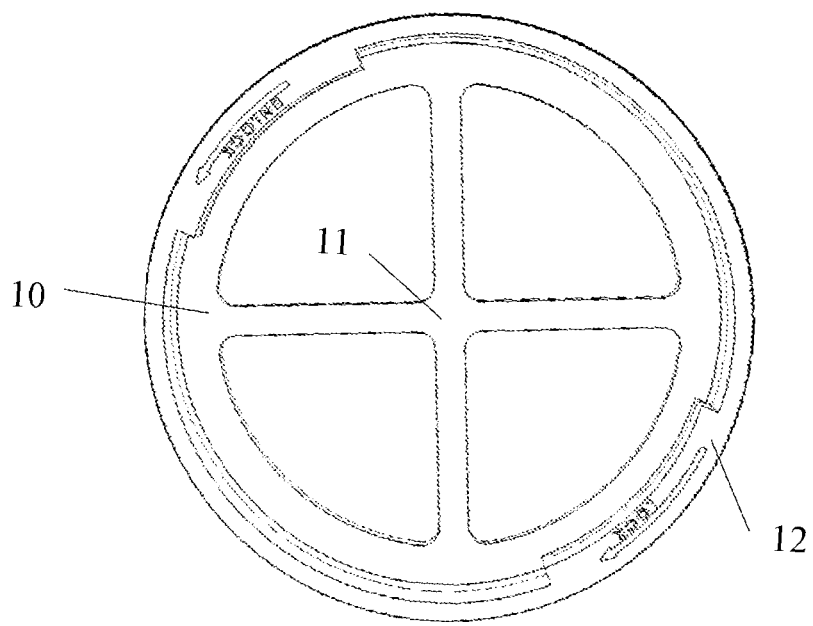
FIG. 2 shows a front view of a vehicle holder attachment in accordance with an embodiment of the present invention.

Turning now to FIGS. 1-2, an exemplary embodiment of a vent holder attachment is shown. In this exemplary embodiment, the vent holder attachment is comprised of a circular vent cover unit 10, a cross-shaped attachment lattice 11, and a twist-and-lock locking mechanism 12. The circular vent cover unit 10 is intended to cover dashboard vents that are circular in shape. One of ordinary skill in the art would appreciate that the vent cover unit 10 could be configured in any number of shapes and sizes in accordance with embodiments of the present invention, and embodiments of the present invention are contemplated for use with vent cover units 10 of any size and/or shape.

The cross-shaped attachment lattice 11, is configured in such a manner as to allow for one or more attachment methods to be received upon the cross-shaped attachment lattice 11, and connected to a receiving component (not shown) on the dashboard vent. Attachment methods include, but are not limited to, zip ties, spring clips, Velcro loops, clips and thread. Receiving components on the dashboard vent include, but are not limited to, vent fins, vent tabs and other lips or channels present on a dashboard vent. In an exemplary embodiment, zip ties may be fastened around the cross-shaped attachment lattice 11 and the vent-fin receiving component(s) of the dashboard vent. One of ordinary skill in the art would appreciate that there are numerous ways to fasten the attachment lattice of a vent holder attachment to a vehicle dashboard vent, and embodiments of the present invention are contemplated for use with any method of fastening an attachment lattice of a vent holder attachment to a vehicle dashboard vent While the attachment lattice in FIGS. 1-2 and other drawings show the attachment lattice in a cross-shaped pattern, it should be noted that the attachment lattice could be configured in numerous manners. For instance, the attachment lattice could be formed from numerous horizontal or parallel bars or in a grid pattern. Optionally, the attachment lattice could be formed in a convex or concave manner to better fit certain vehicle dashboard vents. One of ordinary skill in the art would appreciate that the attachment lattice could be formed in numerous manners in accordance with embodiments of the present invention, and embodiments of the present invention are contemplated for use with attachment lattices formed in any manner.

The twist-and-lock locking mechanism 12 is configured in such a manner as to allow for a tubing connector to be removably attached to the vent holder attachment. In this exemplary embodiment, a tubing connector may be inserted and twisted in a direction until the locking mechanism engages and locks. The tubing connector may then be later removed by applying pressure and twisting in a direction opposite to the previous direction. One of ordinary skill in the art would appreciate that there are numerous locking attachment methods for use with locking mechanisms in accordance with embodiments of the present invention, and embodiments of the present invention are contemplated for use with any manner of locking mechanisms.

Figure 3:
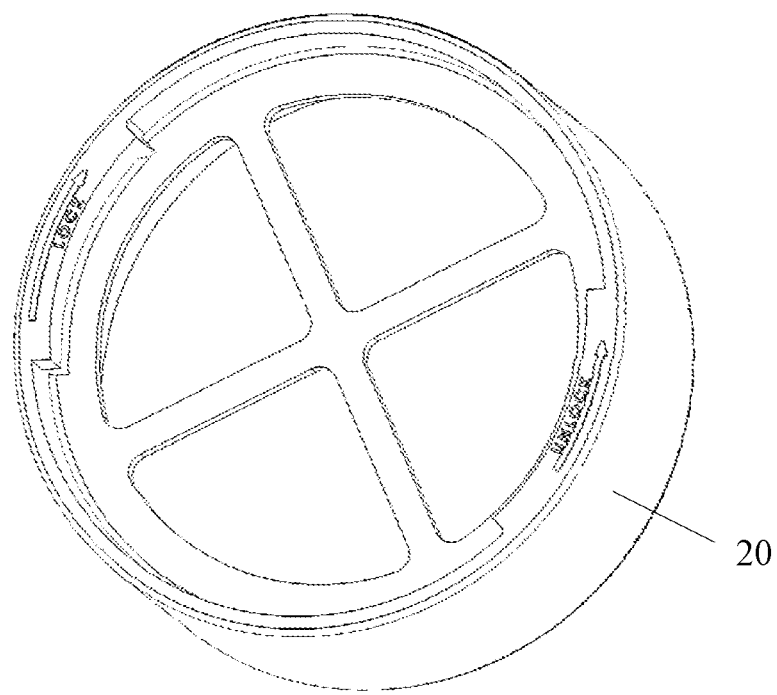
FIG. 3 shows a perspective view of an alternate embodiment of a vehicle holder attachment in accordance with an embodiment of the present invention.

Turning now to FIG. 3, an alternate embodiment of a vent holder attachment is shown, in accordance with an embodiment of the present invention. In this embodiment, the vent cover unit 20 is extended to allow for more distance between the vent holder attachment and the dashboard of a vehicle.

Figure 4:
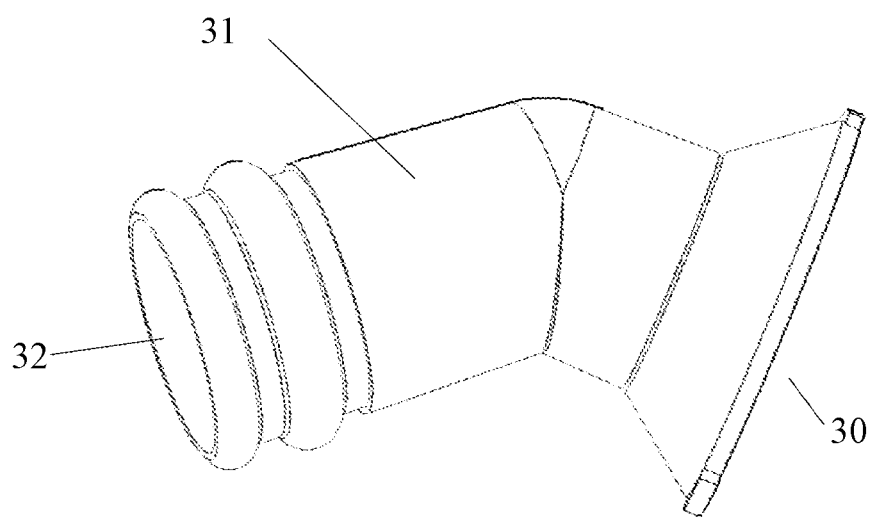
FIG. 4 shows a perspective view of a tubing connector in accordance with an embodiment of the present invention.
Figure 5:
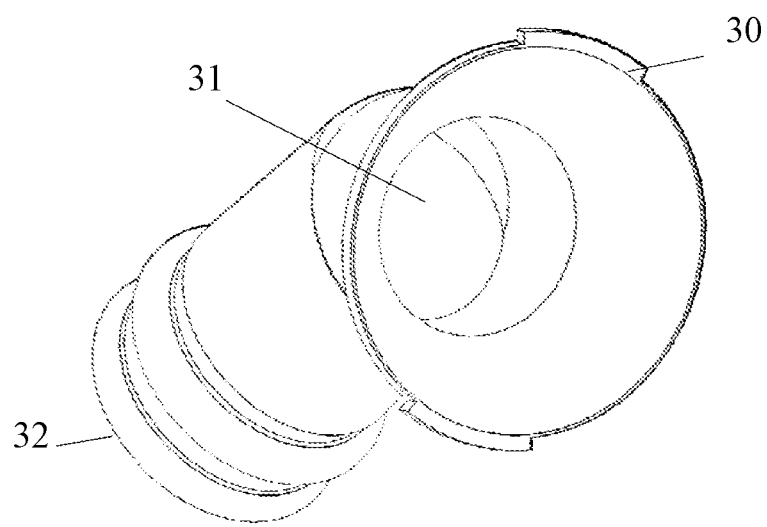
FIG. 5 shows another perspective view of a tubing connector in accordance with an embodiment of the present invention.

Turning now to FIGS. 4-5, an exemplary embodiment of a tubing connector is shown, in accordance with an embodiment of the present invention. The tubing connector is comprised of a tubing connector locking mechanism 30, a hollow pathway 31 and a tube attachment opening 32. The tubing connector locking mechanism 30 is comprised of a locking mechanism complementary to the locking mechanism of the vent holder attachment. The locking mechanism and tubing connector locking mechanism 30 are designed to removably lock together during use of the present invention. When the use of the present invention is not desired, the locking mechanism and the tubing connector locking mechanism 30 may be detached. Advantageously, a user may easily attach and detach the components of the invention allowing for switching between normal operation of the vehicle climate regulation system and the modified operation of the vehicle climate regulation system as detailed herein (e.g., the provision of climate regulation to alternate areas of the vehicle through the apparatus).

According to an embodiment of the present invention, the hollow pathway 31 may be of any shape, angle and length desired. In fact, the entire tubing connector may be interchangeable, allowing for a single vent holder attachment to be used with numerous shapes and sizes of tubing connectors. In this manner, particular characteristics of the tubing connector may be changed without requiring a different vent holder attachment for each tubing connector.

According to an embodiment of the present invention, the tube attachment opening 32 is configured to removably receive an extension tube (not shown). The extension tube may be comprised of a flexible tubing material with a hollow core that will allow airflow to be transferred from a dashboard vent, through a vent holder attachment, through a tubing connector, through the extension tube and finally out an exit end on the extension tube. The length, size and shape of the extension tube may vary depending on the required use. For instance, the extension tube may be a hollow tube made of a flexible material and of a length sufficient to reach the back seat of a vehicle. One of ordinary skill in the art would appreciate that there are numerous sizes, shapes and lengths of extension tubes that may be utilized with embodiments of the present invention, and embodiments of the present invention are contemplated for use with any size, shape and/or length of extension tube.

Figure 6:
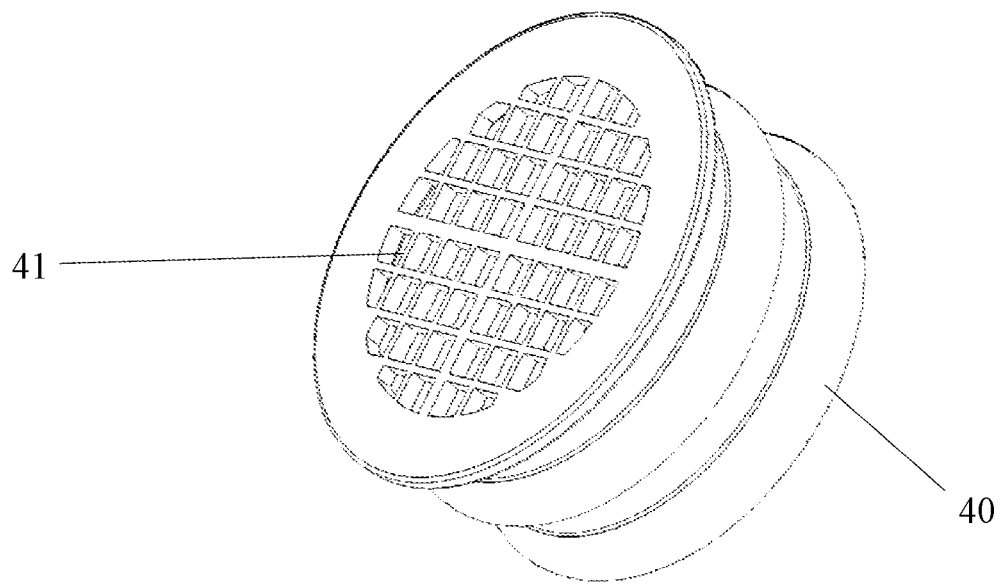
FIG. 6 shows a perspective view of an exit end cover in accordance with an embodiment of the present invention.
Figure 7:
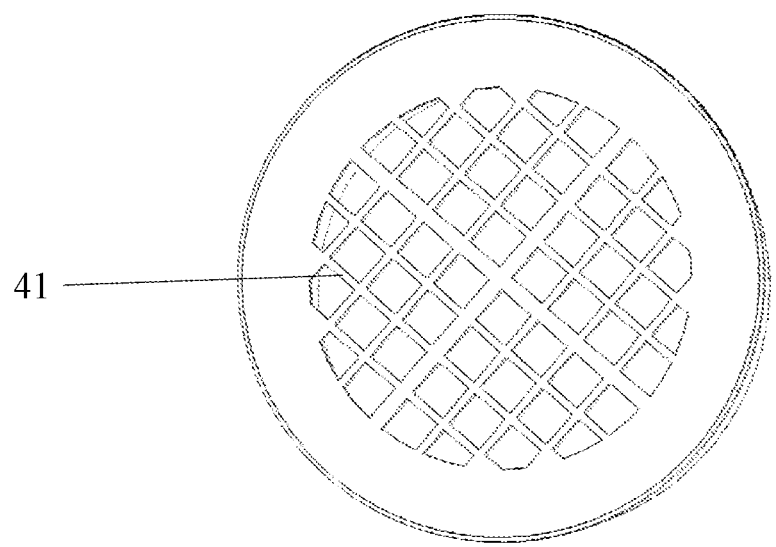
FIG. 7 shows a front view of an exit end cover in accordance with an embodiment of the present invention.

An extension tube may be further comprised of an exit end cover. Turning now to FIGS. 6-7, an exemplary embodiment of an exit end cover is shown, in accordance with an embodiment of the present invention. An exit end cover may be comprised of an attachment end 40, allowing for a removable connection of the exit end cover to the extension tube, and a vent like cover 41 that allows the further direction or manipulation of airflow through the exit end of the extension tube. The vent like cover 41 also prevents objects from being inserted into the end of the extension tube that extends into the region of the vehicle distant from the dashboard vent. In an alternate embodiment, an exit end cover 41 may be a narrowing cone shaped cover that increases the exiting pressure of the airflow, thereby increasing the airflow rate to a focused area. This configuration may be useful in settings where a single individual is the recipient of the climate regulation received from the apparatus.

According to an alternate embodiment of the present invention, the extension tube may be split into numerous pathways. For example an extension tube may be in Y-shape, with the single end being attached to a tubing connector and the other two ends being received at separate areas of the vehicle. In this manner, the climate regulation may be divided between multiple areas within the vehicle. Alternatively, two of the ends of a Y-shaped extension tube may be attached to two separate tubing connectors attached to two separate vehicle dashboard vents. In this configuration, concentrated climate regulation may be received in a specific area of the vehicle. One of ordinary skill in the art would appreciate that the extension tube may be split and shaped in numerous ways in accordance with embodiments of the present invention, and embodiments of the present invention are contemplated for use with extension tubes with any number of splits and shapes.

Figure 8:
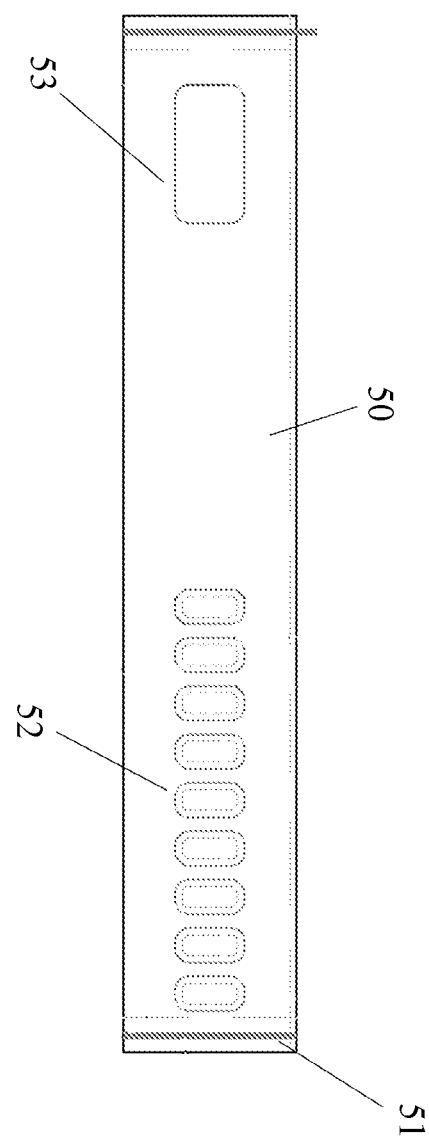
FIG. 8 shows a perspective view of an extension tube cover in accordance with an embodiment of the present invention.

According to an embodiment of the present invention, the extension tube may be covered by an extension tube cover. Turning now to FIG. 8, an exemplary embodiment of an extension tube cover 50 is shown. The extension tube cover 50 is designed to be slipped over or otherwise received around the extension tube and be comprised of one or more of an end attachment means 51, tube attachment means 52 and a tube securing means 53.

According to an embodiment of the present invention, an end attachment means 51 may be located at one or more ends of the extension tube cover 50 and is configured to secure one or more ends of the extension tube cover 50 to the extension tube. The end attachment means 51 may be comprised of any attaching means capable of securing said extension tube cover 50 to said extension tube. Attachment means include, but are not limited to, Velcro, pull-strings and zip-ties. One of ordinary skill in the art would appreciate that there are numerous attachment means that are capable of securing said extension tube cover 50 to said extension tube, and embodiments of the present invention are contemplated for use with any attachment means.

According to an embodiment of the present invention, an tube attachment means 52 may be located at one or more locations along the extension tube cover 50 and are configured to secure the extension tube and the extension tube cover 50 to one or more locations on or in the vehicle. In this manner, the extension tube and the extension tube cover 50, may be secured to various locations in or on the vehicle (e.g., headrests, floors, seats, consoles). The tube attachment means 52 may be comprised of any attaching means capable of securing said extension tube and extension tube cover 50 to said locations on or in the vehicle. Attachment means include, but are not limited to, Velcro, pull-strings and zip-ties. One of ordinary skill in the art would appreciate that there are numerous attachment means that are capable of securing said extension tube cover 50 to said extension tube, and embodiments of the present invention are contemplated for use with any attachment means.

According to an embodiment of the present invention, an tube securing means 53 may be located at one or more locations along the extension tube cover 50 and are configured to secure the end of the extension tube and the extension tube cover 50 to one or more locations on or in the vehicle. In this manner, the extension tube and the extension tube cover 50 may be secured to a location in or on the vehicle (e.g., headrests, floors, seats, consoles) in such a fashion as to allow the airflow to be directed in a specific location of the vehicle. The tube securing means 53 may be comprised of any attaching means capable of securing said extension tube and extension tube cover 50 to said location on or in the vehicle. Securing means include, but are not limited to, Velcro, pull-strings and zip-ties. One of ordinary skill in the art would appreciate that there are numerous attachment means that are capable of securing said extension tube cover 50 to said extension tube, and embodiments of the present invention are contemplated for use with any securing means.

In an alternate embodiment of the present invention, the entire apparatus may be built into the dashboard of a vehicle. In this manner, the apparatus would be indistinguishable from other vehicle dashboard vents. The vent holder attachment, tubing connector and extension tube would be contained within a recess of the dashboard and would be capable of being extended from the dashboard vent when desired by the user. The extension tube in this embodiment would be comprised of an accordion like structure, allowing for the extension tube to be received within the dashboard when the extension of one or more of the dashboard vents is not desired. Additionally, in an exemplary embodiment of the present invention, an exit end cover would be designed with the same appearance as all the other vehicle dashboard vents present in the vehicle. In this manner, the appearance of the apparatus would blend with the other vents of the vehicle.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A vehicle based climate regulation extension apparatus, said apparatus comprising:
  a vent holder attachment configured to be affixed to a vent of a vehicle,
  wherein said vent holder attachment is comprised of a vent cover unit, an attachment lattice, and a locking mechanism,
  wherein said vent cover unit is configured to be attached to a vent of a vehicle via said lattice,
  wherein said vent cover unit comprises two opposed locking ports each having an open and closed end, said locking ports being disposed along an inner wall of said vent cover unit;
  an elbow tubing connector, wherein a first end of said tubing connector is configured to be removably attachable to said vent cover unit via said locking mechanism,
  wherein said first end comprises a rim with opposing wings, wherein said wings are configured to engage said locking ports when said tubing connector is inserted and twisted inside said vent cover unit; and
  an extension tube,
  wherein said extension tube is configured to be removably attachable to a second end of said elbow tubing connector.

2. The apparatus of claim 1, wherein said vent cover unit is circular.

3. The apparatus of claim 1, wherein said attachment lattice is cross-shaped.

4. The apparatus of claim 1, wherein said locking mechanism is a twist-and-lock mechanism.

5. The apparatus of claim 1, wherein said extension tube is further comprised of an exit end cover having a diameter that is approximately the same as the diameter of the exit end.

6. A method for providing directed vehicle climate regulation, said method comprising:

attaching a vent cover unit to a vehicle vent via a securing mechanism between an attachment lattice of said vent cover and a receiving component of said vehicle vent;

attaching an elbow tubing connector to said vent cover unit via a locking mechanism by inserting a first end of said tubing connector into said vent cover unit, and twisting said tubing connector in a direction until the locking mechanism engages and locks;

attaching an extension tube to a second end of said elbow tubing connector via a tube attachment opening;

receiving climate regulation airflow from said vehicle vent; and directing said climate regulation airflow through said vent cover unit, through said tubing connector, through said extension tube and out an exit end of said extension tube.

* * * * *